Sept. 6, 1955     L. A. DEMOREST     2,716,934
CULTIVATOR SHOVEL
Filed Sept. 1, 1950
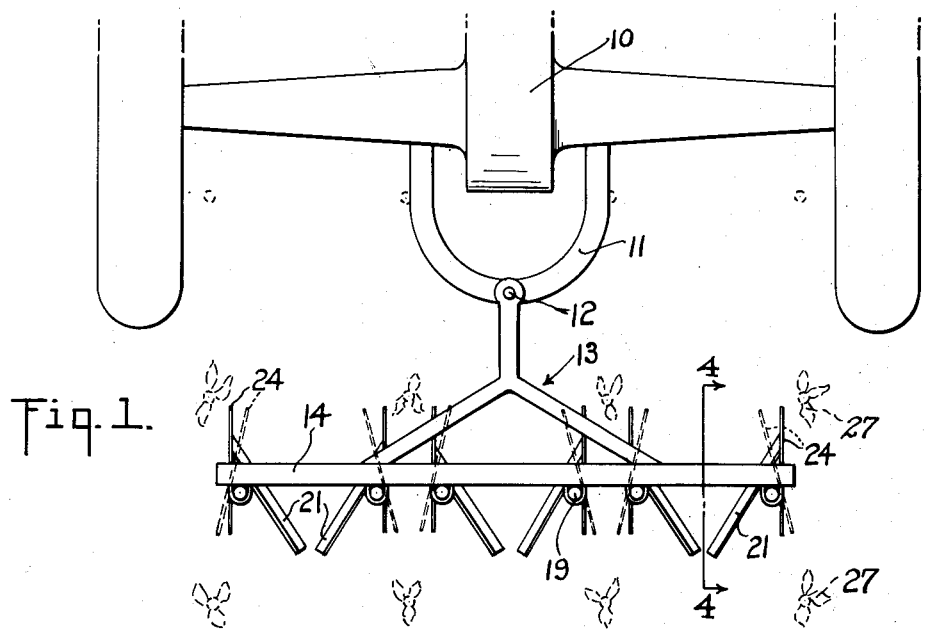
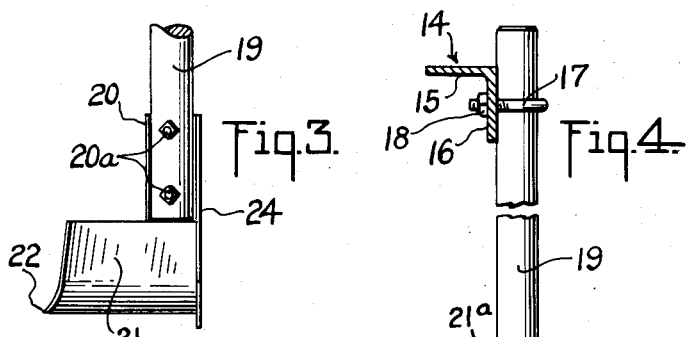
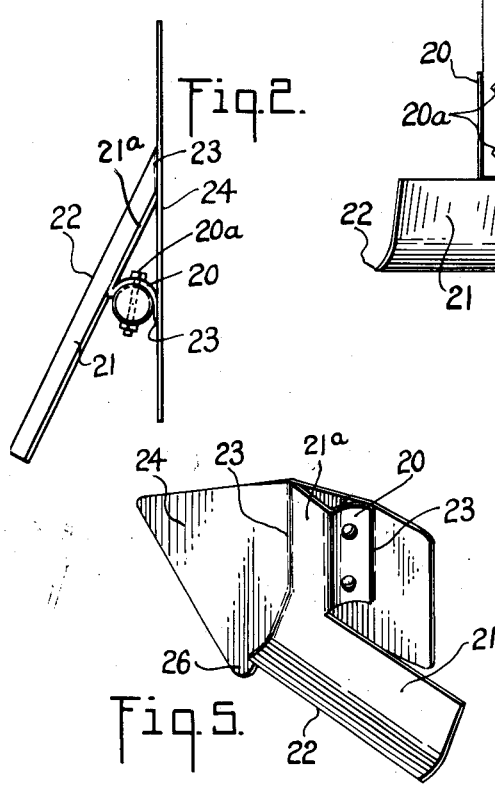
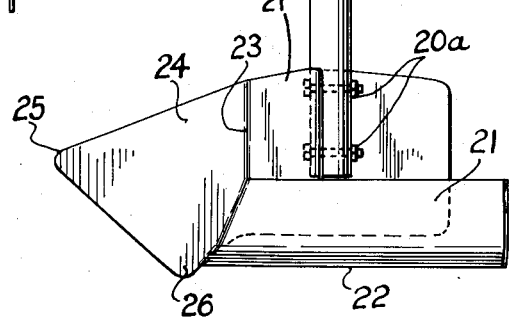
INVENTOR
*Leroy A. Demorest*
BY *W. S. McDowell*
ATTORNEY

United States Patent Office 2,716,934
Patented Sept. 6, 1955

2,716,934

CULTIVATOR SHOVEL

Leroy A. Demorest, Ashley, Ohio, assignor to Cultiguard Shovel Company, a corporation of Ohio Application September 1, 1950, Serial No. 182,732

2 Claims. (Cl. 97—204)

The present invention relates to farm implements of the type employed in the conditioning of soil and in the cultivation of plants. More specifically, this invention is concerned with an improved shovel and cultivator device which may be attached to an associated tractor-drawn or pushed frame, and which is operable simultaneously to cultivate the soil between rows of growing plants and to displace soil sidewise toward the roots of the plants in a hilling-up operation.

In the past, it was usual to employ gang-type culitvators which comprise a supporting frame arranged to be pulled or pushed by an associated tractor, and having a plurality of depending soil-penetrating wings or blades arranged at an inclined angle with respect to the soil over which the implement is passed for the purposes of penetrating the soil a relatively slight distance and severing weeds and the like between the rows of growing plants, such as corn or cotton and the like. Also, particularly in connection with the production of corn, it has been found advantageous to shovel dirt in and around the roots or bases of the plants in their earlier stages of growth to lend support to the plants as the same increase in size. Formerly, cultivation of the rows of plants required one operation, while the hilling up of the plants required a second operation.

It follows, therefore, that the primary object of this invention is to provide an improved combined cultivator and shovel device which is operable simultaneously to cultivate and hill-up rows of growing plants such as corn and cotton and the like.

It is another object of the invention to provide a combined shovel and cultivator device which may be adjusted so as to provide for cultivation between rows of growing plants only, or to provide for the simultaneous cultivation and hilling-up of the growing plants, said selective adjustment being derived through the novel arrangement of the parts or elements of the individual shovel and cultivator devices, to be hereinafter more fully described.

For a further and more detailed understanding of the present invention and the various additional objects and advantages realized therefrom, reference is made to the following description and the accompanying drawing, wherein:

Fig. 1 is a top plan view of a multiple or gang-type tractor-drawn implement frame incorporating my improved combined cultivator and shovel devices;

Fig. 2 is a detailed top plan view of one of the combination cultivator and shovel devices;

Fig. 3 is a rear end elevational view of the device;

Fig. 4 is a vertical sectional view taken along the line 4—4 of Fig. 1 and showing my present improved cultivator and shovel device in side elevation; and Fig. 5 is a detailed perspective view of the present cultivator and shovel device.

Referring now to the drawing, and particularly to Fig. 1 thereof, there is illustrated the rear end portion of a tractor 10 provided with the usual draw bar 11 to which is attached, as at 12, the forward end of a gang-type cultivator frame 13. The frame 13 is provided with a transverse angle iron cross bar 14 arranged to provide an upper horizontally disposed web 15 and a vertically depending web 16.

The vertical web of the angle iron cross bar 14 is formed at spaced intervals with sets of openings for the reception of the threaded end portions of U-shaped metallic straps 17, the threaded ends of the straps 17 receiving cooperatively threaded tensioning nuts 18. Each of the straps 17 receives the upper end portion of a vertically arranged shaft 19 and serves to detachably hold the upper end portion of the shaft in tight-fitting clamping engagement with the vertically disposed web 16 of the angle iron bar.

Each of the shafts 19 is connected at its lower end with an arcuate attaching bracket 20, as by means of nuts and bolts 20a which extend through openings formed in the bracket 20 and the lower end of the shaft 19. Advantageously, the attachment bracket 20 forms an integral rearward portion of a plate-like metallic shield body 21a which is also formed to provide a relatively elongated forwardly and downwardly inclined cultivator wing 21 having a forwardly and arcuately bent sharpened leading edge 22. The plate-like shield body 21a and the outer edge of the bracket 20 are rigidly secured, preferably by welding, as at 23, to one side of a vertically arranged flat shovel blade 24. As shown particularly in Figs. 4 and 5 of the drawing, the flat shovel blade 24 is inclined downwardly at its forward end and terminates in a relatively blunt point 25. The lower edge of the blade 24 tapers upwardly at its intermediate portion from an intermediately disposed relatively blunt soil-penetrating point 26. The rear end portion of the lower edge of the blade lies in a substantially horizontal plane, and with the point 26 provides a relatively shallow soil-penetrating lower edge. The sharpened leading edge 22 of the cultivator wing extends laterally outwardly and rearwardly of the shovel blade 24 on one side thereof and is arranged in a horizontal plane substantially along the plane of the intermediate point 26 of the shovel blade 24. The major portion of the wing 21 is substantially flat, but terminates inwardly of the sharpened leading edge 22 in a slightly forwardly turned edge portion. The lower edge of the shovel blade 24 and the wing 21 should advantageously penetrate the soil by a depth of one and one-half to two inches, and toward this end, the shaft 19 may be adjusted vertically with reference to the frame 13 so as to control the degree of penetration of the cultivator wing and shovel blade.

In operation, the individual cultivator and shovel devices, each comprising the blade 24, wing 21 and bracket 20, are arranged relative to rows of growing plants, indicated at 27 in Fig. 1 of the drawing, to present the flat side of the blade 24 outwardly toward the bases or roots of the plants, while the cultivator wing extends diagonally inwardly between the rows of plants. Advantageously, the frame 13 may support any number of the cultivator and shovel devices so as to completely cultivate the area between adjacent rows of plants and at the same time to present the flat side of the device toward the roots of the plants. As shown in Fig. 1, the blades 24 occupy parallel planes relative to the line of draught of the implement, and in such positions merely penetrate and slit the soil without displacing the same laterally toward the bases of the plants. When it is desired to simultaneously cultivate and hill up the plants, the shafts 19 are loosened within the clamping straps 17 and twisted to bring the shovel blades 24 into angular relation with respect to the line of draught of the implement, as indicated by broken lines in Fig. 1. In this manner, as the implement is drawn through the soil, the shovel blades 24 cause the soil to be displaced sidewise and up around the roots and bases of the plants 27, while at the same time the cultivator wings sever growing weeds and the like between the rows of the plants 27. The plate-like shield body 21a functions during movement of the shovel devices through the soil to deflect displaced soil laterally away from the bracket 20 and the lower end of its associated shaft 19, whereby to prevent the accumulation of soil around the points of attachment of the shovel device to the shaft 19 and consequent clogging of the shovel device with tightly packed earth.

While the implement indicated in Fig. 1 is of the drawn type, it will be manifest that the same may, with equal facility, be pushed ahead of the tractor in order that visual reference may be had to the position of the blades with respect to the growing plants at all times.

I claim:

1. A soil-penetrating, unitary cultivating and hilling shovel device comprising a flat, vertically arranged blade member terminating at one end in a forwardly pointed extremity; a generally vertically arranged, shield-forming, plate-like body rigidly secured at its forward end to one side of said blade member intermediate the ends of the latter and extending laterally outwardly from said one side of said blade member in acutely angular relation thereto, said body being provided at its lower edge with an elongated, downwardly inclined cultivator wing disposed in laterally offset and acutely angular relation to said blade member and terminating forwardly in a sharpened cutting edge, said body also being provided at its rearward end with an angularly related attachment web extending inwardly toward and rigidly secured to said one side of said blade member, the attachment web of said body being disposed in substantially perpendicular relation to said blade member and provided with bolt-receiving openings for securing said shovel device to a shank of a cultivator frame, and said attachment web being shielded against soil accumulation during soil penetration by said plate-like body.

2. A soil-penetrating, unitary cultivating and hilling shovel device comprising a first flat, vertically arranged blade terminating at one end in a forwardly projecting pointed extremity; a second shield-forming, plate-like body rigidly joined at one end with the forward portion of said blade and extending rearwardly and laterally to one side of said blade in acutely angularly relation thereto, said body being disposed in a generally vertical plane and provided at its rearward end with an angularly related attachment bracket member extending inwardly toward and rigidly joined with said blade, said bracket member being provided with bolt-receiving openings for securing said shovel to a cultivator shank, said plate-like body serving to shield said attachment bracket member against soil accumulation thereabout during soil-penetrating operations; and a cultivator wing rigidly carried with said body and extending rearwardly and laterally outwardly from the body in acutely angular relation to said blade, said wing being disposed in a generally downwardly inclined plane and terminating in a lower, forwardly disposed, sharpened edge.

References Cited in the file of this patent

UNITED STATES PATENTS

| | | |
|---|---|---|
| 771,530 | Card | Oct. 4, 1904 |
| 1,634,531 | Bergsten | July 5, 1927 |
| 1,811,584 | Johnson | June 23, 1931 |
| 1,847,490 | Mayfield | Mar. 1, 1932 |
| 2,145,007 | Foster | Jan. 24, 1939 |
| 2,396,132 | Shaffer | Mar. 5, 1946 |
| 2,538,093 | Goode | Jan. 16, 1951 |